United States Patent Office 2,949,352
Patented Aug. 16, 1960

2,949,352

PROPELLANT COMPOSITION

Frank B. Cramer, Reseda, Calif., assignor to
North American Aviation, Inc.

No Drawing. Filed Oct. 1, 1956, Ser. No. 612,967

20 Claims. (Cl. 52—.5)

This invention relates to a novel propellant composition. More particularly, this invention relates to a solid composition suitable for use as a rocket propellant.

Rocket motor propellants commonly comprise an oxygen carrier such as ammonium perchlorate dispersed in a plastic binding material. A number of shortcomings have been found to exist in rocket propellants of this type. One shortcoming has been a deterioration of the cohesive quality of plastic materials during the burning of the propellant charge. This resulted in cracking of the solid propellant capsule. This results in an exposure of a greater surface area to the flames and causes uneven burning and danger of explosion. A limitation of prior art rocket propellants has been their low ignition temperature. Consequently, they could not be stored at elevated temperatures of the kind that are encountered in storage or carrying compartments of high speed modern aircraft where temperatures often exceed 250° F. A need existed, therefore, for a novel composition of matter which could be used as a rocket propellant which had a high ignition temperature and would also overcome some of the shortcomings of prior art compositions.

It is therefore an object of the present invention to provide a novel composition of matter suitable for use as a rocket propellant. It is also an object of this invention to provide a propellant composition which has a high ignition temperature. Another object of this invention is to provide a propellant composition which retains its cohesive quality during burning. It is also an object to provide a rocket propellant which, when cast in a rocket motor, firmly adheres to the walls of the motor casing. Another object is to provide a propellant composition which can be stored or carried at elevated temperatures.

The above and other objects of this invention are accomplished by providing a composition comprising (1) a silicone rubber and (2) an inorganic perchlorate intimately distributed throughout said polymerized composition.

This composition can be further described as comprising (1) a silicone rubber composed of structural units having the general formula

wherein each of $R_1$ and $R_2$ is a hydrocarbon group selected from the class consisting of alkyl radicals having from 1 to about 3 carbon atoms, and monocyclic aryl radicals having from 6 to about 8 carbon atoms, and (2) distributed throughout said silicone rubber, an inorganic perchlorate having the general formula $$M(ClO_4)_x$$

wherein M is selected from the class consisting of groups I-A, I-B and II-A metals of the periodic table of elements.

The preparation of the silicone polymer and rubber may be found in a text entitled "Chemistry of the Silicones" by E. G. Rochow, Second Edition, published by John Wiley & Sons, Inc., New York. In general, the preparation consists of hydrolyzing dihydrocarbon substituted dihalosilanes. An example is the hydrolysis of dimethyl dihalosilane with subsequent heating in the presence of a small amount of ferric chloride or sulfuric acid or sodium hydroxide to form an elastomer or gum. The hydrolysis and heating produces a silicone polymer composed of structural units having the general formula

The average number of such polymerizing units in a polymer molecule can vary from 2 to about 40,000 and more. The elastomer may also have small amounts of $R_1R_2SiO$ and $R_1R_2Si(OH)_2$ monomers present. The average number of polymerizing units per molecule, however, would be substantially from 2 to about 40,000. The polymer obtained upon hydrolysis of a dihydrocarbon substituted dihalosilane may be linear with terminal hydroxy groups having the general formula

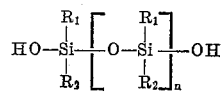

wherein $n$ has an average value of from 1 to about 40,000. The polymeric molecules may also have cyclic structures in which case the general formula can be written as follows:

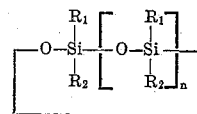

with $n$ having the same value as given above. The viscosity of the elastomer may be controlled by controlling the degree to which the polymerization is allowed to proceed on heating. The identity of the R groups in the silicone polymer will depend on the identity of the R groups in the dihydrocarbon substituted dihalosilane which is hydrolyzed to form the polymer. The dihydrocarbon substituted dihalosilane has the general formula

X represents a halogen atom as, for example a chlorine atom. $R_1$ and $R_2$ can be the same or different and can be alkyl hydrocarbon radicals having from 1 to about 3 carbon atoms and/or monocyclic aryl hydrocarbon radicals having from 6 to about 8 carbon atoms. The alkyl hydrocarbon radicals can be methyl, ethyl, propyl and isopropyl radicals. The aryl hydrocarbon radicals can be phenyl radicals having from 0 to 2 carbon atoms in hydrocarbon side chain substituents on the ring. That is, the aryl hydrocarbon radicals can have from 6 to 8, inclusive, carbon atoms. Examples of such aryl radicals are phenuyl, tolyl, xylyl, styryl, and ethylphenyl radicals, etc. A mixture of two or more different dihydrocarbon substituted dihalosilanes can be hydrolyzed providing a polymer having a variety of different hydrocarbon groups attached to the silicon atoms. Hence, it is possible to have both methyl and phenyl groups in the polymer present in different proportions. For example, the hydrolysis of the mixture of 90 mol percent dimethyl dichlorosilane with 10 mol percent diphenyl dichlorosilane yields a polymer containing 10 percent phenyl groups based on the total number of hydrocarbon groups present. In like manner, compositions are obtained containing 0.1 weight percent of ethylphenyl groups and 99.9 weight percent ethyl groups. Likewise, compositions containing 50 weight percent xylyl groups and 50 weight percent propyl groups are obtained in this manner. The examples given hereinbelow more fully illustrate the various silicone-oxidizing compositions of this invention.

The metal perchlorates employed as oxidizing agents or oxygen carriers in the compositions are anhydrous and have the general formula $M(ClO_4)_x$ wherein M is a metal and $x$ is the valence of M. Since the propellant composition is required to withstand high temperature storage, it is preferable that the melting point and the decomposition temperatures of the oxidizer be as high as possible. The perchlorates of the group I-A, group I-B and group II-A metals are found to have the required high temperature stability and propellant compositions containing these are an embodiment of this invention. Hence, the metal perchlorates used in the preparation of the propellant compositions include lithium perchlorate, sodium perchlorate, potassium perchlorate, rubidium perchlorate, and cesium perchlorate which are the perchlorates of the metals of group I-A of the periodic table of elements; silver perchlorate which is a perchlorate of a group I-B metal; and magesium perchlorate, calcium perchlorate, strontium perchlorate, and barium perlorate which are the perchlorates of the group II-A metals.

Burning catalysts composed of one or a mixture of two or more metal oxide powders in amounts sufficient to improve the burning rate of the composition may also be added. The amounts usually range from about 0.01 to about 3 weight percent based on the weight of the oxidizer employed. The particle size of the powders can range from about 10 to about 250 microns in diameter. Nonlimiting examples of metals that serve as burning catalysts are copper, vanadium, chromium, silver, molybdenum, zirconium, antimony, manganese, iron, cobalt and nickel. Examples of metal oxide burning catalysts are ferric oxide, aluminum, copper oxide, chromic oxide, as well as the oxides of the other metals mentioned above.

In the preparation of the silicone rubber-oxidizer compositions, finely divided oxygen carrier in the form of metal perchlorates having a particle size of from about 10 to 250 microns in diameter are milled or mixed with a silicone elastomer until a homogeneous composition is obtained. The temperature at which the milling or mixing is performed is not critical. If carried out at elevated temperature, it should not exceed about 100° C. in order that vulcanization does not take place prematurely. A small amount of a compatible curing catalyst is usually added at this time which later aids in the curing at elevated temperatures to an insoluble elastic material. Nonlimiting examples of catalyst used for this purpose are aluminum chloride, tris-trimethylsilyl borate and benzoyl peroxide. The curing catalysts are added in amounts of from 0.1 to about 10 weight percent based on the weight of the silicone elastomer, preferably 0.1 to 6 weight percent.

The silicone elastomer-oxygen carrier composition is then cast or extruded into rocket motors or appropriate molds and subsequently heated to a temperature sufficient to bring about reaction or vulcanization, causing the setting-up of the silicone elastomer. This produces a silicone-oxidizer composition in which the particles of oxygen carrier compound are firmly bound together by a resilient silicone rubber polymer. The curing or vulcanization is usually carried out in two steps or stages. The silicone elastomer-oxygen carrier composition is first heated to and maintained at a temperature of substantially 110–130° C. for a period of substantially 1–4 hours. This is followed by heating to and maintaining the composition at a temperature of substantially 180–220° C. for a period of substantially 4–20 hours. The composition is then cooled to normal handling temperature of 20–60° C.

When a silicone elastomer is employed having a viscosity of about 10,000 centipoises or less, the elastomer and oxidizing components can be mixed in an apparatus equipped with suitable mixing means. When, however, the viscosity of the silicone elastomer is much higher, blending of the oxidizer and elastomer is usually performed by milling on a two roll differential rubber mill. After the milling is complete, the silicone-oxidizing composition is packed into a rocket motor, either by a casting or extrusion method, care being taken to avoid entrapment of air in the rocket charge.

The following examples will more fully illustrate the compositions of this invention and methods for their preparation.

*Example I*

To 25 parts of silicone elastomer being milled on a two roll differential rubber mill were added 75 parts of potassium perchlorate having a particle size of from 10 to about 250 microns in diameter, and 0.6 part of benzoyl peroxide, and the milling continued until a homogeneous composition was obtained. The silicone elastomer used in this instance was a hydrolysate of a mixture of 90 mol percent dimethyl dichlorosilane and 10 mol percent of diphenyl dichlorosilane which was subsequently carefully heated with a small amount of iron chloride to convert the hydrolysis to the elastomer or silicone gum as it is commonly known. The ferric chloride was washed out of the gum. The elastomer-oxidizer composition was then extruded into a conventional cylindrically-shaped rocket motor casing. The extrusion was made through a die which provided for a firing chamber positioned longitudinally along the axis of the motor. After filling the motor casing, a closure cap was affixed to the forward end. The charged rocket motor was then subjected to a temperature of substantially 120° C. for a period of 2 hours. It was then heated to 200° C. for a period of 14 hours. At the end of this time the charge was set so that the oxygen carrier particles of potassium perchlorate were firmly held together by the silicone polymer or rubber. The propellant charge had a firm but resilient texture and had a high cohesive quality. The charge adhered well to the wall of the rocket motor casing.

Several small cylindrical molds 6 inches in length and 2 inches in diameter were likewise filled by the procedure of Example I to provide specimens for various testing procedures. The composition of Example I was found to have an ignition temperature of over 266° C. and burned evenly on the surface. The physical properties of the composition were unchanged by heating to 260° C. Also, satisfactory flexibility was retained at temperature as low as −51° C.

Following the procedure of Example I, compositions are prepared in which 0.1 percent of the hydrocarbon groups attached to silicon atoms are phenyl groups and the amount of potassium perchlorate is 85 weight percent based on the total weight of the composition. In like manner, a composition is prepared in which 50 percent of the hydrocarbon groups attached to silicon atoms are phenyl groups and the amount of potassium perchlorate is 70 weight percent based on the combined silicone-oxidizer composition. Of these, it is found that the composition in which 10 percent of the hydrocarbon groups attached to silicon are phenyl groups possesses superior cohesive characteristics at elevated temperatures.

*Example II*

To a vessel equipped with means for agitation are added 30 parts of dimethyl polysiloxane elastomer having a viscosity of 10,000 centipoises and 70 parts of sodium perchlorate having a particle size of from 10 to 50 microns in diameter, and 0.6 parts of benzoyl peroxide.

The mixture is agitated for a period of about 15 minutes until a homogeneous propellant mixture is obtained. The mixture is then transferred to a casting vessel equipped with means for feeding the propellant in ribbon form into a desired mold such as a rocket motor. The casting vessel is connected to a vacuum vessel adapted to hold the mold or rocket motor and also equipped with means for agitating the mold or motor. A rocket motor casing, with a Teflon coated mandrel inserted through the exhaust chamber at the rearward end of the vessel and positioned longitudinally along the axis of the motor, is placed in the vacuum chamber. The open front end of the rocket motor is placed beneath the ribbon-forming feeder means of the casting vessel. The air is then withdrawn from the vacuum vessel causing the propellant mixture to be fed from the casting vessel through the ribbon-forming feeder means into the rocket motor casing. The motor casing is maintained in constant vibration by the agitating means during the casting. When the casing is filled, the closure cap is affixed to the front end of the rocket motor. The charged rocket motor is then subjected to elevated curing temperatures of substantially 120° C. and 200° C. as described in Example I. The charge is cured to form a combustible composition which has a high cohesive quality and adheres well to the rocket motor casing. The methylpolysiloxane elastomer used herein is obtained by the hydrolysis of dimethyldichlorosilane as described in the text by Rochow mentioned above.

*Example III*

Following the procedure of Example I, a silicone-oxidizer composition is prepared from 50 parts of magnesium perchlorate and 50 parts of a silicone elastomer in which 10 percent of the hydrocarbon groups attached to the silicon atoms are propyl groups, 10 percent are ethyl groups, 75 percent are methyl groups and 5 percent are styryl groups. The silicone composition is obtained by hydrolyzing a mixture of 20 mol percent ethyl propyl dichlorosilane, 75 mol percent dimethyl dichlorosilane, and 5 mol percent of distyryl dichlorosilane.

The substitution of barium perchlorate for magnesium perchlorate in the composition of Example III gives equally good results.

*Example IV*

A composition is prepared as in Example I employing 9 parts of sodium perchlorate and 1 part of a silicone elastomer in which 35 percent of the hydrocarbon groups attached to silicon atoms are xylyl groups and 65 percent are ethyl groups.

Other silicone-oxidized compositions are prepared by the process of Example I, containing 75 weight percent cesium perchlorate and 25 weight percent silicone gum in which the hydrocarbon groups are methyl, containing in addition, 3 weight percent based on the perchlorate of alumina powder having a particle size of from 10 to about 250 microns in diameter.

The amount of oxygen carrier, namely, the metal perchlorate used, can vary from about 50 weight percent to about 90 weight percent, based on the total amount of perchlorate and binder in the propellant composition. It is preferred, however, that the propellant contain from 70 to about 85 weight percent perchlorate in order to give maximum specific impulse, that is, the greatest thrust per unit weight of propellant.

The cured propellant has the advantage of good adherence to the wall of the propellant casing. This is important in order to prevent burning of the propellant between the wall and the charge which often causes failure of the rocket. Another advantage that the propellant composition of this invention has is that it retains its elasticity throughout the firing so that the charge does not crack from the heat generated at the burning surface. This also is important since cracking of the charge results in nonuniform burning because of the greater and unevenly distributed surface area being exposed to the flame. Such uneven burning enhances the danger of explosion and flight failure. Still another advantage is the high specific impulse obtained by the use of the compositions of this invention as a rocket propellant. This makes it possible to obtain longer ranges with the same amount of propellant.

The burning rate of the propellants of this invention was determined by the Crawford strand burning rate procedure as set out in the Office of Scientific Research Development Bulletin No. 6374. This procedure is referred to in Solid Propellant Information Agency Abstract under the number 0662. The propellant of Example I was found to burn at the rate of 4 inches per second. The propellant compositions of Examples II–IV have similar burning rates. The use of burning catalyst increases the burning rate.

One manner of testing performance of rockets containing the propellants of this invention consists of firing the rocket while anchored to a stand. The rocket is ignited by lighting a fuse connected to a pyrotechnic composition placed in the firing chamber of the rocket. The pyrotechnic composition is composed of such material as black powder or a mixture of ammonium perchlorate and powdered metal such as aluminum, iron, magnesium, etc. The pressure generated within the firing chamber of the rocket is measured by means of a pressure pick-up. The thrust is measured by attaching the motor to a thrust cell which contains a strain gage adapted to indicate the magnitude of the thrust on an oscillograph to which it is connected. The rocket propellant composition of this invention, when tested in motors by this procedure, all give good results with respect to the combustion chamber pressure and thrust.

Rocket motors charged with the composition of this invention give good performance with respect to flight and range on firing.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A composition consisting essentially of (1) from about 50 to about 10 weight percent of a silcone rubber and (2) from about 50 to about 90 weight percent an inorganic perchlorate intimately distributed throughout said polymerized composition.

2. A composition consisting essentially of (1) a silicone rubber composed of structural units having the general formula

wherein each of $R_1$ and $R_2$ is a hydrocarbon group selected from the class consisting of alkyl radicals having from 1 to about 3 carbon atoms, and monocyclic aryl radicals having from 6 to about 8 carbon atoms and (2) intimately distributed throughout said silicone rubber, 50 to 90 weight percent of an inorganic perchlorate having the general formula $M(ClO_4)_x$ wherein M is selected from the class consisting of groups I–A, I–B and II–A metals of the periodic table of elements.

3. The composition of claim 2 wherein from 0.1 to about 50 percent of said $R_1$ ad $R_2$ hydrocarbon groups are aryl radicals having from about 6 to about 8 carbon atoms.

4. A composition consisting essentially of (1) a silicone rubber composed of structural units in the polymer having the general formula

wherein $R_1$ and $R_2$ are hydrocarbon groups selected from the class consisting of methyl radicals and phenyl radicals and wherein 0.1–50 percent of said hydrocarbon radicals are phenyl radicals and (2) distributed throughout said silicone rubber, from 50 to 90 weight percent of an inorganic perchlorate having the general formula $M(ClO_4)_x$ wherein M is selected from the class consisting of groups I–A, I–B and II–A metals of the periodic table of elements.

5. The composition of claim 4 wherein 10 percent of said hydrocarbon radicals are phenyl radicals.

6. A composition consisting essentially of (1) a silicone rubber composed of structural units having the general formula

wherein $R_1$ and $R_2$ are hydrocarbon groups selected from the class consisting of methyl radicals and phenyl radicals and wherein 0.1–50 percent of said hydrocarbon radicals are phenyl radicals and (2) intimately distributed throughout said silicone rubber, from 50 to 90 weight percent of an inorganic perchlorate having the general formula $M(ClO_4)$ wherein M is a group I–A metal of the periodic table of elements.

7. A composition consisting essentially of (1) a silicone rubber composed of structural units having the general formula

wherein $R_1$ and $R_2$ are hydrocarbon groups selected from the class consisting of methyl radicals and phenyl radicals and wherein 0.1–50 percent of said hydrocarbon radicals are phenyl radicals and (2) from 50 to about 90 weight percent potassium perchlorate intimately distributed throughout said silicone rubber.

8. The composition of claim 7 wherein the amount of potassium perchlorate is 75 weight percent.

9. A process for the preparation of a silicone-oxidizer composition comprising heating a homogeneous composition of (1) a silicone elastomer, obtained by the hydrolysis and heating of a dihydrocarbon substituted dihalosilane having the general formula $R_1R_2Si(X)_2$ wherein X is a halogen and each of $R_1$ and $R_2$ is a hydrocarbon group selected from the class consisting of alkyl radicals having from 1 to about 3 carbon atoms and monocyclic aryl radicals having from 6 to about 8 carbon atoms, (2) from 50 to about 90 weight percent of an inorganic perchlorate having the formula $M(ClO_4)_x$ wherein M is selected from the class consisting of groups I–A, I–B and II–A of the periodic table of elements, and $x$ represents the valency of M and (3) from 0.1 to about 10 weight percent based on the silicone elastomer of a compatible catalyst; and causing said composition to react at a temperature sufficient to bring about setting-up of said silicone elastomer.

10. A composition consisting essentially of (1) a silicone rubber composed of structural units having the general formula

wherein each of $R_1$ and $R_2$ is a hydrocarbon group selected from the class consisting of methyl radicals and phenyl radicals and wherein 10 percent of said hydrocarbon radicals are phenyl radicals and (2) 75 weight percent potassium perchlorate intimately distributed throughout said silicone rubber.

11. A composition consisting essentially of (1) a silicone rubber composed of structural units having the general formula

wherein each of $R_1$ and $R_2$ is an alkyl radical having from 1 to about 3 carbon atoms, and (2) intimately distributed throughout said silicone rubber, 50 to 90 weight percent of an inorganic perchlorate having the general formula $M(ClO_4)_x$ wherein M is selected from the class consisting of groups I–A, I–B and II–A metals of the periodic table of elements.

12. A composition consisting essentially of (1) a silicone rubber composed of structural units having the general formula

wherein each of $R_1$ and $R_2$ is an alkyl radical having from 1 to about 3 carbon atoms, and (2) intimately distributed throughout said silicone rubber, from 50 to 90 weight percent of an inorganic perchlorate having the general formula $M(ClO_4)$ wherein M is a group I–A metal of the periodic table of elements.

13. A composition consisting essentially of (1) a silicone rubber composed of structural units having the general formula

wherein each of $R_1$ and $R_2$ is an alkyl radical having from 1 to about 3 carbon atoms, and (2) from 50 to about 90 weight percent sodium perchlorate intimately distributed throughout said silicone rubber.

14. The composition of claim 13 wherein $R_1$ and $R_2$ are methyl groups and the amount of sodium perchlorate is 70 weight percent.

15. A process for the preparation of a silicone-oxidizer composition comprising heating a homogeneous composition of (1) a silicone elastomer, obtained by the hydrolysis and heating of a dihydrocarbon substituted dihalosilane having the general formula $R_1R_2Si(X)_2$ wherein X is halogen and each of $R_1$ and $R_2$ is a hydrocarbon group selected from the class consisting of alkyl radicals having from 1 to about 3 carbon atoms, and monocyclic aryl radicals having from 6 to about 8 carbon atoms, with (2) from 50 to about 90 weight percent of an inorganic perchlorate having the formula $M(ClO_4)_x$ wherein M is selected from the class consisting of groups I–A, I–B and II–A of the periodic table of elements, and $x$ represents the valency of M, and (3) from 0.1 to about 10 weight percent based on the silicone elastomer of a compatible curing catalyst; said heating being carried out at a temperature of substantially 180–220° C. for a period of substantially 4–20 hours to bring about a setting up of said silicone elastomer.

16. A process for the preparation of a silicone-oxidizer composition comprising heating a homogeneous composition of (1) a silicone elastomer, obtained by the hydrolysis and heating of a dihydrocarbon substituted dihalosilane having the general formula $R_1R_2Si(X)_2$ wherein X is a halogen and each of $R_1$ and $R_2$ is a hydrocarbon group selected from the class consisting of alkyl radicals having from 1 to about 3 carbon atoms, and monocyclic aryl radicals having from 6 to about 8 carbon atoms, (2) from 50 to about 90 weight percent of an inorganic perchlorate having the formula $M(ClO_4)_x$ wherein M is selected from the class consisting of groups I-A, I-B and II-A of the periodic table of elements, and x represents the valency of M, and (3) from 0.1 to about 10 weight percent based on the silicone elastomer of a compatible curing catalyst; said heating being carried out at a temperature of substantially 110–130° C. for a period of substantially 1–4 hours, followed by heating at a temperature of substantially 180–220° C. for a period of substantially 4–20 hours to bring about a setting up of said silicone elastomer.

17. A process for the preparation of a silicone rubber-inorganic perchlorate composition comprising heating a homogeneous composition of (1) a silicone rubber composed of structural units having the general formula

wherein each of $R_1$ and $R_2$ are hydrocarbon groups selected from the class consisting of methyl radicals and phenyl radicals and wherein 0.1–50 percent of said hydrocarbon radicals are phenyl radicals and (2) intimately distributed throughout said silicone rubber, from 50 to 90 weight percent of an inorganic perchlorate having the general formula $M(ClO_4)$ wherein M is a group I-A metal of the periodic table of elements; said heating being carried out at a temperature of substantially 110–130° C. for a period of substantially 1–4 hours followed by heating at a temperature of substantially 180–220° C. for a period of substantially 4–20 hours.

18. A process for the preparation of a silicone rubber-potassium perchlorate composition comprising heating a homogeneous composition of (1) a silicone rubber composed of structural units having the general formula

wherein each of $R_1$ and $R_2$ is a hydrocarbon group selected from the class consisting of methyl radicals and phenyl radicals, and wherein 10 percent of said hydrocarbon radicals are phenyl radicals and (2) 75 weight percent potassium perchlorate intimately distributed throughout said silicone rubber; said heating being carried out at a temperature of substantially 110–130° C. for a period of substantially 1–4 hours followed by heating at a temperature of substantially 180–220° C. for a period of substantially 4–20 hours.

19. A process for the preparation of a silicone rubber-sodium perchlorate composition comprising heating a homogeneous composition of (1) a silicone rubber composed of structural units having the general formula

wherein each of $R_1$ and $R_2$ is an alkyl radical having from 1 to about 3 carbon atoms, and (2) from 50 to about 90 weight percent sodium perchlorate intimately distributed throughout said silicone rubber; said heating being carried out at a temperature of substantially 110–130° C. for a period of substantially 1–4 hours followed by heating at a temperature of substantially 180–220° C. for a period of substantially 4–20 hours.

20. A process for the preparation of silicone rubber-sodium perchlorate composition comprising heating the composition of claim 13 wherein $R_1$ and $R_2$ are methyl groups and the amount of sodium perchlorate is 70 weight percent; said heating being carried out at a temperature of substantially 110–130° C. for a period of substantially 1–4 hours followed by heating at a temperature of substantially 180–220° C. for a period of substantially 4–20 hours.

References Cited in the file of this patent

UNITED STATES PATENTS

| | | |
|---|---|---|
| 2,539,404 | Crutchfield et al. | Jan. 30, 1951 |
| 2,597,641 | Hull et al. | May 20, 1952 |
| 2,742,672 | Thomas | Apr. 24, 1956 |
| 2,855,372 | Jenkins et al. | Oct. 7, 1958 |

FOREIGN PATENTS

| | | |
|---|---|---|
| 655,585 | Great Britain | July 25, 1951 |

OTHER REFERENCES

"Jet Propulsion," Air Technical Service Command (1946), page 158.

Rochow: "Chemistry of the Silicones," 2nd Ed., John Wiley & Sons, Inc., New York (1951), pages 94–97.